Sept. 18, 1923.  M. SMITH  1,468,087
DRILLING MACHINE MOUNTING
Filed Sept. 9, 1920
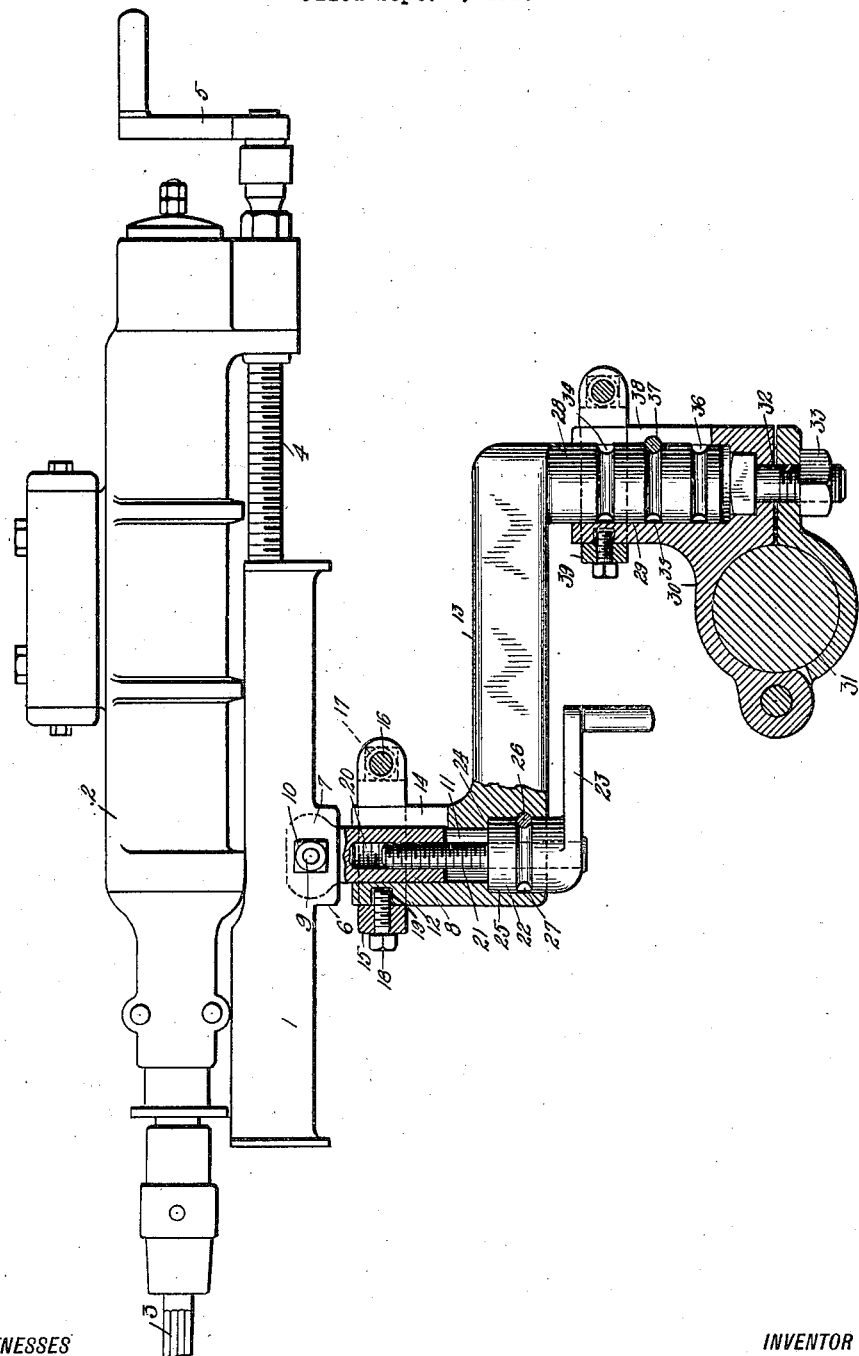
WITNESSES
INVENTOR
MICHAEL SMITH
BY
ATTORNEYS Patented Sept. 18, 1923.

1,468,087

UNITED STATES PATENT OFFICE.

MICHAEL SMITH, OF NEWARK, NEW JERSEY.

DRILLING-MACHINE MOUNTING.

Application filed September 9, 1920. Serial No. 409,145.

*To all whom it may concern:*

Be it known that I, MICHAEL SMITH, a citizen of the United States, and a resident of Newark, in the county of Essex and State of New Jersey, have invented a new and Improved Drilling-Machine Mounting, of which the following is a full, clear, and exact description.

This invention relates to supports, and has particular reference to a support or mounting for a drilling machine, such as a rock drilling machine.

An object of the invention is to provide a mounting for a machine of this type which is capable of a very wide range of adjustability so that the maximum scope of operation may be provided for the drill without resetting the drill on the main support.

Another object is to provide a mounting in which the drill may be simply and rapidly adjusted at different levels, so that the horizontal range of the machine may be multiplied by adjusting its vertical position without moving it on the main support.

A further object resides in the mechanical construction and arrangement of parts as hereinafter set forth in the detail description and claims.

In the use of drilling machines, and particularly rock drilling machines, it is customary to support the drilling machine from a bar or beam which is wedged vertically or horizontally between the walls of the passage in which the drilling is taking place. The machine is usually mounted on this beam or bar or support in a manner which permits of a certain degree of adjustment with respect thereto so that a certain surface of the wall to be drilled may be covered without readjusting the machine on the above-mentioned beam or bar. My invention in general comprises the provision of such an adjustable support as will provide a very wide degree of adjustability. It comprises an arm which is pivotally attached to the above-mentioned fixed support at one end and at the other end is pivotally attached to the rock drilling machine. The axes about which the machine is pivoted on the adjustable support and about which the adjustable support is pivoted about the fixed support may be parallel. Means are provided whereby the adjustable support may be moved axially with respect to the fixed support and whereby the machine may be adjusted axially with respect to the adjustable support, and both may at the same time be rotated to any degree about their respective axes. Clamping means are also provided to fix the position of either the machine or the adjustable support in respect to the parts to which they are pivoted.

The invention is illustrated in the drawing, which represents a side elevation, showing in section those parts which are directly related to the adjustable pivoted supports.

As shown in the drawing, the machine embodying my invention comprises a framework 1 on which a power mechanism 2 is mounted in any suitable fashion. This mechanism 2 may be a steam or a pneumatic power unit. A drill 3 of any suitable type is adapted to be driven by this power unit. The usual feed screw 4 is provided and adapted to be operated by the handle 5 in a well known manner. The frame 1 is provided with a yoke portion 6 into which fits the upper end 7 of a cylindrical, interiorly bored collar 8. A bolt 9 passes through suitable apertures in the yoke 6 and the upper end 7 of the collar 8 and is provided with a clamping nut 10 whereby the frame 1 may be adjusted in any position about the bolt 9 with respect to the collar 8. The collar 8 is adapted to fit within a bore 11 in one end 12 of an arm 13. This end 12 of the arm is provided with a slot 14 and is surrounded with a clamping collar 15 provided with suitable tightening means in the form of a clamping bolt 16 and nut 17. The clamping collar 15 is angularly fixed on the end 12 of the arm 13 by the engagement of a screw bolt 18 on the collar with a recess 19 in the end 12. The interior bore 20 of the collar 8 is threaded and adapted to receive a threaded rod 21 extending upwardly thereinto from a plug 22. This plug 22 is provided with a handle portion 23 and is seated against a shoulder 24 in a bore 25 at the lower side of the end 12 and is fixed in the bore 25 by means of a ring 26 seated in a groove 27 in the plug. By turning the handle 23 the threaded rod 21 and the threaded bore 20 engage, whereby the collar 8 is moved axially with respect to the end 12 of the arm 13. At the same time the frame 1 may be rotated about the axis of collar 8 and may be fixed in any position by means of the clamping collar 15.

The opposite end 28 of the arm 13 is disposed along an axis parallel to the axis of the end 12 of this arm and is adapted to enter a bore 29 in a lug 30. This lug 30 is adapted to embrace a bar or beam 31 and can be clamped thereto by means of a clamping bolt 32 and nut 33. The lug may be split as shown to permit this clamping action. Along its length the end 28 is provided with a plurality of circular peripheral grooves 34, 35 and 36. A circular pin 37, corresponding to the pin 26, is provided at one level in the clamping lug 30 and engages with one or the other of the grooves 34, 35 and 36. This pin 37 and the above mentioned grooves provide means whereby the end of 28 of the arm 13 may be adjusted at a plurality of different levels axially with respect to the bore 29. The lug 30 is also provided with a slot 38, and at its upper end is surrounded by a clamping collar 39 whereby, in a manner identical with the action of the clamping collar 15, the end 28 of the arm 13 may be rotated about the bore 29 and fixed in any position with respect thereto.

In the operation of the device, in accordance with the description above set forth, it will be seen that the rock drilling machine is mounted on an adjustable arm which itself is capable of adjustment in two planes and with respect to which the rock drilling machine is also adjustable in two planes.

What I claim is:

1. A mounting for drilling machines, comprising a fixed support, an arm pivoted at one end to said support adapted for rotary movement with respect to an axle, a clamping collar attached to said support and adapted to clamp the end of said arm in any desired position, a drilling machine having a depending collar, said collar pivotally mounted on the other end of said arm, clamping means surrounding said collar to fix the position of the rock drilling machine in its rotary movement, threaded means on said collar, and similarly threaded means on said arm engaging the threaded means on the collar to adjust the collar and drilling machine axially with respect to the arm.

2. A mounting for drilling machines, which comprises a supporting arm having integral, parallel, oppositely extending end portions, a fixed support, a lug clamped on said fixed support, said lug having a bore to receive one end of said arm, said arm having a plurality of circular peripheral grooves therein at different intervals throughout its length, and an adjustable pin disposed on the lug to engage in the grooves whereby this position of the arm in the bore can be determined.

3. A mounting for drilling machines, which comprises a supporting arm having integral, parallel, oppositely extending end portions, a fixed support, a lug clamped on said fixed support, said lug having a bore to receive one end of said arm, said arm having a plurality of circular peripheral grooves therein at different intervals throughout its length, an adjustable pin disposed on the lug to engage in the grooves whereby this position of the arm in the bore can be determined, and clamping means embracing a portion of the lug when the arm is disposed in the bore to fix the position of the arm in the bore.

MICHAEL SMITH.